United States Patent
Lee et al.

(10) Patent No.: US 8,373,828 B2
(45) Date of Patent: Feb. 12, 2013

(54) DISPLAY APPARATUS

(75) Inventors: Jeongho Lee, Seoul (KR); Junho Song, Seongnam-si (KR); Kyehun Lee, Asan-si (KR); Swae-Hyun Kim, Asan-si (KR)

(73) Assignee: Samsung Display Co., Ltd. (KR)

( * ) Notice: Subject to any disclaimer, the term of this patent is extended or adjusted under 35 U.S.C. 154(b) by 231 days.

(21) Appl. No.: 13/034,173

(22) Filed: Feb. 24, 2011

(65) Prior Publication Data

US 2011/0216275 A1 Sep. 8, 2011

(30) Foreign Application Priority Data

Mar. 4, 2010 (KR) .................. 10-2010-0019531

(51) Int. Cl.
*G02F 1/1335* (2006.01)

(52) U.S. Cl. ........... 349/106; 349/139; 349/38; 349/110

(58) Field of Classification Search ............. 349/96, 349/97, 104, 106, 139, 38, 39, 140, 110
See application file for complete search history.

(56) References Cited

U.S. PATENT DOCUMENTS

| | | | |
|---|---|---|---|
| 7,289,180 B2 * | 10/2007 | Kim et al. | 349/141 |
| 7,471,347 B2 * | 12/2008 | Yoo et al. | 349/38 |
| 7,843,539 B2 * | 11/2010 | Kim et al. | 349/139 |
| 7,986,377 B2 * | 7/2011 | Kim et al. | 349/38 |
| 8,203,682 B2 * | 6/2012 | Lee et al. | 349/147 |
| 8,243,218 B2 * | 8/2012 | Yoo et al. | 349/38 |
| 2011/0216275 A1 * | 9/2011 | Lee et al. | 349/106 |

* cited by examiner

*Primary Examiner* — Brian Healy
(74) *Attorney, Agent, or Firm* — Innovation Counsel LLP

(57) ABSTRACT

A display apparatus includes a display-controlling substrate and an opposite substrate facing the display-controlling substrate. The display-controlling substrate includes a base substrate portion and has a display area and a peripheral area surrounding the display area with pixel units being formed in the display area of the display-controlling substrate. Each pixel unit includes a gate line segment extending in a first direction and having a respective first width (W1), a data line segment, a color filter, a pixel electrode, and a storage electrode segment having a second width and extending in a direction different from that of the gate line segment. Spaces between adjacent pixel electrodes, where uncontrolled light might leak out are overlapped by one or the other of the first and second width segments where the widths of the opaque segments are wider than the overlapped space.

16 Claims, 9 Drawing Sheets

DISPLAY APPARATUS

CROSS-REFERENCE TO RELATED APPLICATION

This application relies for priority upon Korean Patent Application No. 2010-19531 filed on Mar. 4, 2010, the contents of which are herein incorporated by reference in its entirety.

BACKGROUND

1. Field of Disclosure

The present disclosure of invention relates to a display apparatus having a color-filter-on-array (COA) structure.

2. Description of Related Technology

In general, a flat panel display such as a Liquid Crystal Display (LCD) apparatus includes a display-controlling panel having pixel units provided therein and an opposite substrate that conventionally includes color filters for the respective pixel units as well as a black matrix formed between the color filters to block light from leaking uncontrollably from areas between the pixel units. Recently, however, various structures for the display apparatus have been proposed, including the so-called, COA structure in which the pixel units and their respective color filters are both formed on the same substrate, namely, the display-controlling panel. Another recently proposed structure is the black-matrix-on-array (BOA) structure in which the pixel units as well as the black matrix are formed on the display-controlling panel. A combined structure to which the COA concept and the BOA concept are both applied has been suggested.

SUMMARY

According to exemplary embodiments, a display apparatus is provided to include a display-controlling panel having a base substrate portion and an opposite substrate facing the display-controlling panel. The display-controlling panel includes a display area and a peripheral area surrounding the display area, where light-controlling pixel units are disposed within the display area of the display-controlling panel.

Each pixel unit includes a gate line segment (a part of a corresponding gate line) where the gate line segment is disposed directly on the base substrate portion. Each pixel unit further includes a data line segment (a part of a corresponding data line), a color filter, a pixel electrode disposed on the color filter, and a storage electrode segment disposed directly on the base substrate portion and capacitively coupled to the data line segment.

The gate line segment of each respective pixel unit has a first width (W1) in a plan view sense that is wider than an overlapping inter-pixel-electrode gap between overlapping edges of pixel-electrode immediately above the gate line segment. The storage electrode segment of each respective pixel unit has a second width (W2) in a plan view sense that is wider than an overlapping inter-pixel-electrode gap between overlapping edges of pixel-electrode immediately above the storage electrode segment. As a result of the greater widths and placements of the gate line segments and storage electrode segments, uncontrolled backlighting is substantially blocked from leaking in a top plan view sense through spaces between edges of adjacent pixel-electrode. As such, the image seen by a user of the display device does not have its contrast compromised by leakage of uncontrolled light between the pixel-electrodes.

Accordingly, a separate black matrix is omitted from being formed in the second substrate of the display apparatus thereby simplifying the structure and reducing the manufacturing cost and complexity of the display apparatus.

BRIEF DESCRIPTION OF THE DRAWINGS

The above and other advantages of the here disclosed teachings will become more readily apparent by reference to the following detailed description when considered in conjunction with the accompanying drawings wherein.

DETAILED DESCRIPTION

Figure 1A:
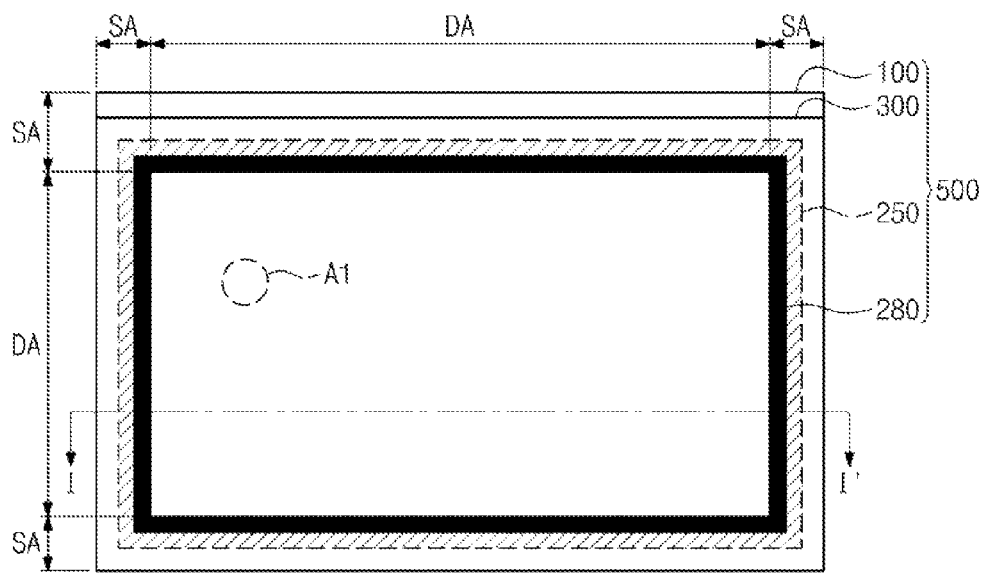
FIG. 1A is a plan view showing a display apparatus according to an exemplary embodiment in accordance with the disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the present teachings.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present teachings. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure most closely pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present teachings will be explained in more detail with reference to the accompanying drawings.

Figure 1B:
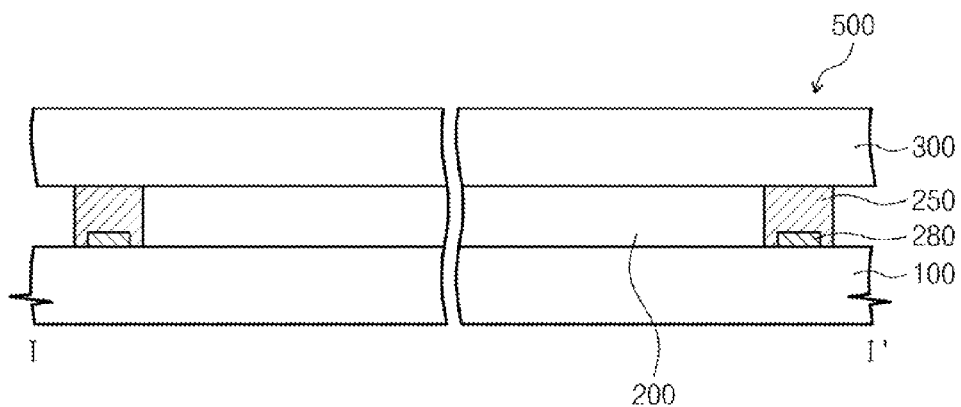
FIG. 1B is a cross-sectional view taken along a line I-I' of FIG. 1A.

FIG. 1A is a plan view showing a display apparatus according to an exemplary embodiment. FIG. 1B is a cross-sectional view taken along a line I-I' of FIG. 1A.

Referring to FIGS. 1A and 1B, a display apparatus 500 includes a display-controlling substrate 100 and an opposite substrate 300 facing the display-controlling substrate 100. In the present exemplary embodiment, the display apparatus 500 may be a liquid crystal display (LCD), and thus a layer of liquid crystal material 200 may be disposed between the display-controlling substrate 100 and the opposite substrate 300.

The display-controlling substrate 100 includes a display area, DA in which an image is formed for display to a user. The display-controlling substrate 100 also includes a peripheral area, SA surrounding the display area DA. The display area DA includes a plurality of pixel units PXL (see FIG. 3) arranged therein. Although not shown in FIG. 1A, if the display apparatus 500 is the liquid crystal type of display, the display apparatus 500 may further include a backlight unit (not shown). In this case, the display apparatus 500 controls an amount of light passed from the backlight unit and through the display area DA to thereby display a desired image to a user viewing the display area DA in a top plan view sense. Detailed description of an exemplary pixel unit will be described in detail with reference to FIGS. 2 to 5.

The display apparatus 500 further includes an inter-substrate coupling member 250 disposed between the display-controlling substrate 100 and the opposite substrate 300 to correspond to the peripheral area SA. In detail, the coupling member 250 is provided between the display-controlling substrate 100 and the opposite substrate 300 to be disposed along an outer portion of the display area DA. The coupling member 250 physically joins the display-controlling substrate 100 with the opposite substrate 300 (for example by adhesively joining the two together) and it also functions to seal the liquid crystal material 200 in the space between the spaced apart display-controlling substrate 100 (base substrate portion) and its opposite substrate 300 (second substrate).

In addition, the display apparatus 500 may further include a first edge light-blocking member 280 arranged in the peripheral area SA to block uncontrolled light (light whose transmission is not controlled by a corresponding pixel unit) from escaping through edges around the display area DA. If the liquid crystal display is used as the display apparatus 500, the light blocked by the first edge light-blocking member 280 may be light emitted from the underlying backlight unit.

According to the exemplary embodiment shown in FIGS. 1A and 1B, the first edge light-blocking member 280 may include a black organic material. The first edge light-blocking member 280 is formed along the outer portion of the display area DA together with the coupling member 250 and overlapped with the coupling member 250.

In FIG. 1A, the first edge light-blocking member 280 is formed on a portion of the display area SA, but it should not be limited thereto. That is, the first edge light-blocking member 280 may be extended to the outer edge of the display-controlling substrate 100.

Figure 2:
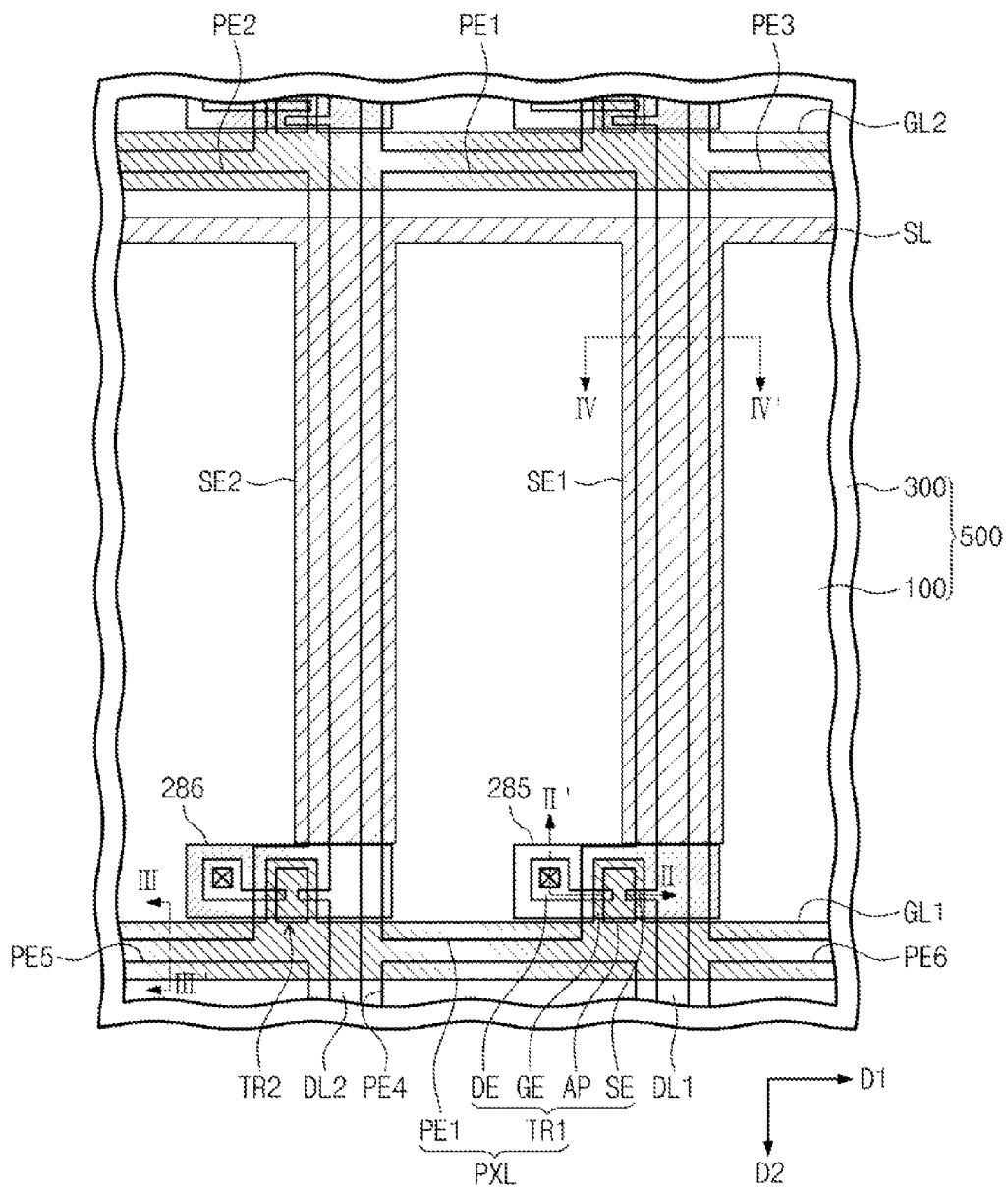
FIG. 2 is a partially enlarged view showing a portion of the display apparatus of FIG. 1A.
Figure 3:
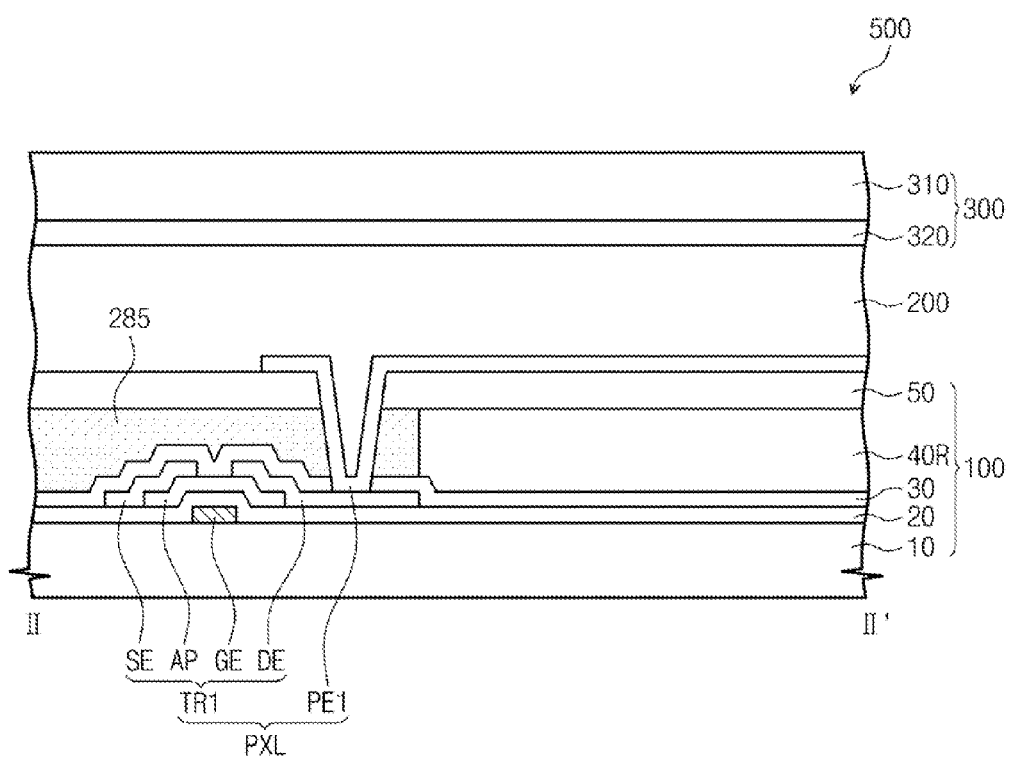
FIG. 3 is a cross-sectional view taken along a line II-II' of FIG. 2.

FIG. 2 is a partially enlarged view showing a portion of the display apparatus of FIG. 1A. FIG. 3 is a cross-sectional view taken along a line II-IF of FIG. 2. In detail, FIG. 2 shows a portion of the display-controlling substrate 100 corresponding to a first area A1 in the display area (DA) of the display apparatus 500.

Figure 4:
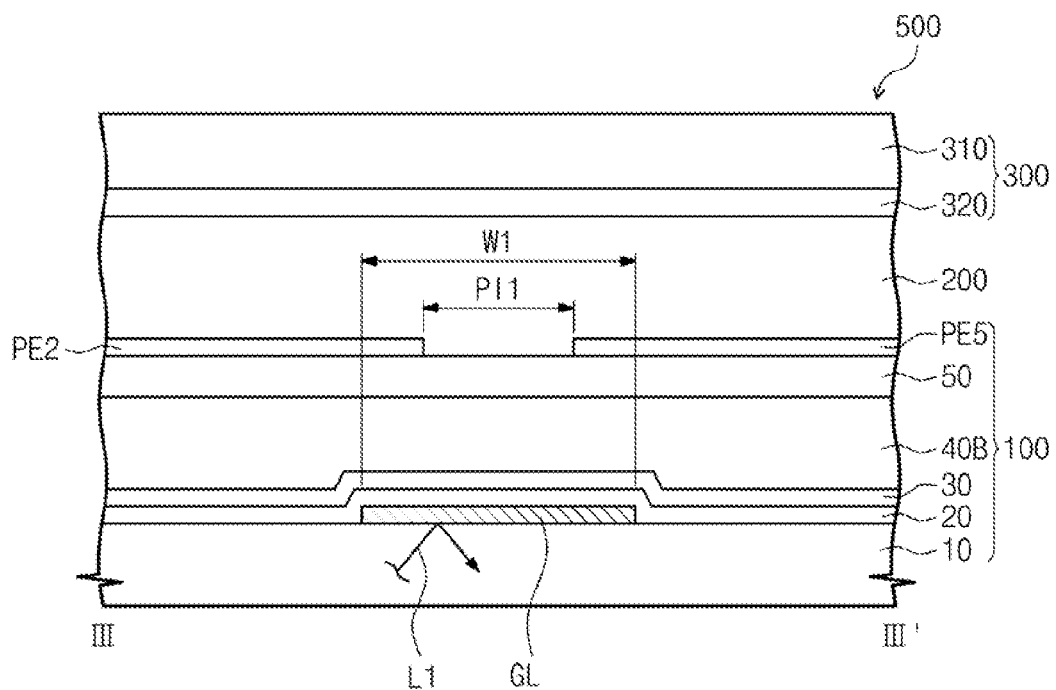
FIG. 4 is a cross-sectional view taken along a line III-III' of FIG. 2.
Figure 5:
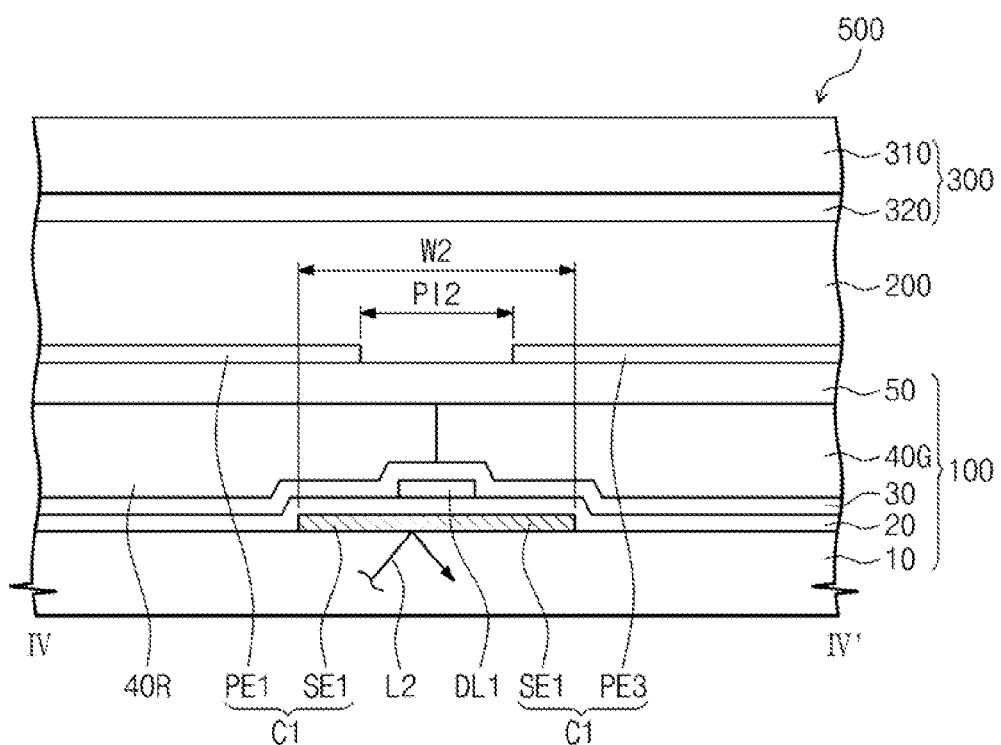
FIG. 5 is a cross-sectional view taken along a line IV-IV' of FIG. 2.

Red, green, and blue color filters 40R, 40G, and 40B respectively shown in FIGS. 3, 4, and 5 have been omitted in FIG. 2 in order to more clearly show elements for the display-controlling substrate 100 except for the red, green, and blue color filters 40R, 40G, and 40B. Further, the display-controlling substrate 100 includes many pixel units, however just one pixel unit PXL will be focused upon and described in detail with reference to FIGS. 2 and 3 since all the pixel units have substantially same structures and functions and are formed as tiled repeating units in matrix format.

Referring to FIGS. 2 and 3, the display apparatus 500 includes the display-controlling substrate 100, the opposite substrate 300, and the liquid crystal material layer 200 disposed between the display-controlling substrate 100 and the opposite substrate 300.

The display-controlling substrate 100 includes a base substrate portion 10 (e.g., glass or a transparent plastic), a plurality of gate lines including first and second gate lines GL1 and GL2, a plurality of charge storage lines including line SL, a plurality of data lines including first and second data lines DL1 and DL2, a plurality of storage electrodes including first and second storage electrodes SE1 and SE2, a plurality of thin film transistors (TFTs) including first and second thin film transistors TR1 and TR2, a plurality of color filters including the red color filter 40R, the blue color filter 40B shown in FIG. 4, the green color filter 40G shown in FIG. 5, a plurality of light-blocking members including first and second light-blocking members 285 and 286, and a plurality of pixel-electrodes including first, second, third, fourth, fifth, and sixth pixel electrodes PE1, PE2, PE3, PE4, PE5, and PE6.

The first and second gate lines, GL1 and GL2 of FIG. 2 extend in a first direction D1 and are disposed directly on the base substrate portion 10. The first gate line GL1 is electrically and integrally connected to gate electrodes of the first and second thin film transistors TR1 and TR2 to provide the first and second thin film transistors TR1 and TR2 with a gate signal from an external source.

The main storage line SL also extends longitudinally in the first direction D1 but it is spaced apart along the D2 direction from the first and second gate lines GL1 and GL2 and has storage electrode (SE) extensions or segments integrally branching off from it to extend in the D2 direction. The storage line SL as well as its integral storage electrode segments, are also disposed directly on the base substrate portion 10 (see SE1 of FIG. 5) just as are the first and second gate lines GL1 and GL2. The storage line SL is electrically and integrally connected to the first and second storage electrodes SE1 and SE2 to provide the first and second storage electrodes SE1 and SE2 with a common voltage from an external source.

A gate insulating layer 20 covers the gate electrodes (GE, see FIG. 3), and the gate lines (GL, see FIG. 4), and the storage lines as well as storage extensions (SE, see FIG. 5). The first and second data lines DL1 and DL2 are disposed directly on the gate insulating layer 20 so as to extend longitudinally in a second direction D2, the latter being substantially perpendicular to the first direction D1. As seen in FIG. 5, the data lines are disposed over the storage line extensions SE with the gate insulating layer 20 being interposed therebetween so as to define charge storage capacitors. The first data line DL1 is electrically and integrally connected to a corresponding data electrode (DE) of the first thin film transistor TR1 and provides a first data signal from an external source to the first thin film transistor TR1. Similarly, the second data line DL2 is electrically and integrally connected to a corresponding data electrode (DE) of the second thin film transistor TR2 and provides a second data signal from the external source (e.g., data lines driver IC, not shown) to the second thin film transistor TR2.

The first and second storage electrodes SE1 and SE2 integrally branch from the storage line SL and extend in the second direction D2. In addition, the first and second storage electrodes SE1 and SE2 are directly disposed on the base substrate portion 10 as are the first and second gate lines GL1 and GL2. As mentioned, the first storage electrode SE1 is partially overlapped with the first data line DL1 to form a corresponding first storage capacitor, and the second storage electrode SE2 is partially overlapped with the second data line DL2 to thus form a corresponding second storage capacitor. The first and second storage electrodes SE1 and SE2 will be again described in detail with reference to FIG. 5.

In the present exemplary embodiment, the first thin film transistor TR1 will be described in detail as a representative example. The first thin film transistor TR1 is electrically connected to the first gate line GL1 and the first data line DL1. The first thin film transistor TR1 includes a gate electrode GE integrally branched from the first gate line GL1, an active semiconductive pattern AP disposed over the gate electrode GE with the gate insulating layer 20 being interposed therebetween. The first thin film transistor TR1 further includes a source electrode SE integrally branched from the first data line DL1 and overlapped with the active pattern AP, and a drain electrode DE spaced apart from the source electrode SE and overlapped with the active pattern AP. In addition, the drain electrode DE is electrically connected to the first pixel electrode PE1 by way of a drain contact hole. The first thin film transistor TR1 may be turned on or off in response to the gate signal provided through the first gate line GL1, and thus the first thin film transistor TR1 may be switched to selectively couple the data signal provided on the data line to the first pixel electrode PE1 when the gate electrode is driven with a turn-on voltage ($V_{Gon}$).

Meanwhile, a second insulating and passivating layer 30 is disposed on the first and second thin film transistors TR1 and TR2. The red color filter 40R is disposed on the passivating/insulating layer 30 to overlap with the first pixel electrode PE1 when viewed in a plan view. In addition, although not shown in FIGS. 3 to 5, the red color filter 40R may be disposed on the passivating/insulating layer 30 and overlapped with a planarization layer 50 and thereabove with the fourth pixel electrode PE4. The green color filter and the blue color filter will be described in detail with reference to FIGS. 4 and 5.

The first transistor-covering light-blocking member 285 is disposed on the passivating/insulating layer 30 so as to cover the first thin film transistor TR1 and the second light-blocking member 286 is similarly disposed on the passivating/insulating layer 30 so as to cover the second thin film transistor TR2. In the present exemplary embodiment, the first and second light-blocking members 285 and 286 may include a same material, such as a black organic material, as is used in the first edge light-blocking member 280 to block light.

Leakage of uncontrolled backlighting light between the adjacent and repeated pixel units is blocked by the combination of the opaque materials of the gate electrodes GE, the source electrodes SE, and the drain electrodes DE and the transistor-covering light-blocking members, 285 and 286.

When viewed in a plan view sense, the first and second light-blocking member 285 and 286 are spaced apart from each other and each has an island shape. In a conventional LCD device, areas between the pixel electrodes are generally covered by a light-blocking black matrix provided in the upper or common electrode substrate. However, in the illustrated embodiment, the area between the pixel electrodes is covered by the opaque materials of the first and second storage electrodes SE1 and SE2 and the first and second gate lines GL1 and GL2. Accordingly, the display-controlling substrate 100 according to the present exemplary embodiment does not need a full black matrix in its upper (or lower base) substrates to cover the areas between the pixel electrodes. The first and second storage electrodes SE1 and SE2 and the first and second gate lines GL1 and GL2 will be described in detail with reference to FIGS. 4 and 5.

In order to planarize the overall surface of the base substrate portion 10 on which the first and second light-blocking members 285 and 286, the red color filter 40R, the green color filter, and the blue color filter have been formed, as well as to passivate such a surface, the afore-mentioned planarization layer 50 is disposed directly on the first and second light-blocking members 285 and 286 as well as directly on the red, blue, and green color filters 40R, 40B, and 40G. In addition to providing planarization, the planarization layer 50 may prevent contaminants such as out-gases generated from the material of the first and second light-blocking members 285 and 286, and such as pigment materials leached from the red color filter 40R, the green color filter 40G, or the blue color filter 40B from being introduced into the overlying liquid crystal layer 200.

In the present exemplary embodiment shown in FIG. 2, the first to sixth pixel electrodes PE1, PE2, PE3, PE4, PE5, and PE6 may be arranged both in the first and second directions D1 and D2 as a matrix configuration. The first to sixth pixel electrodes PE1 to PE6 have essentially the same structure and function, and thus the first pixel electrode PE1 will be described as a representative example.

The first pixel electrode PE1 is disposed on the planarization layer 50 where the latter overlaps the red color filter 40R when viewed in a top plan view. In addition, the first pixel electrode PE1 is electrically connected to the drain electrode DE through a contact hole formed by removing a corresponding portion of the first light-blocking member 285 and of the planarization layer 50.

The opposite substrate 300 includes a second base substrate portion 310 and a common electrode 320 disposed on the second substrate 310. The common electrode 320 forms corresponding liquid crystal capacitors with adjacent ones of the first to sixth pixel electrodes PE1 to PE6 and voltages stored in the liquid crystal capacitors are used to control alignment of correspondingly interposed molecules of the liquid crystal layer 200. In addition, the opposite substrate 300 of the present embodiment does not include a black matrix as described above and thus its complexity and cost of manufacture are reduced.

FIG. 4 is a cross-sectional view taken along a line III-III' of FIG. 2.

Referring to FIGS. 2 and 4, the blue color filter 40B is disposed on the passivating/insulating layer 30 and is overlapped with the planarization layer 50, where the latter supports the second pixel electrode PE2 and the fifth pixel electrode PE5. The blue color filter 40B filters the light provided from the backlight unit (not shown) disposed under the display-controlling substrate 100 so as to provide a bluish light (e.g., one having blue as its predominantly output wavelength).

Referring to FIG. 4, when it is viewed in a top plan view sense, the first gate line GL1 has a corresponding first width W1 that is overlapped by a smaller spacing PI1 between the second pixel electrode PE2 and the fifth pixel electrode PE5 adjacent to the second pixel electrode PE2 in the second direction D2. As a result, light leakage area between the second pixel electrode PE2 and the fifth pixel electrode PE5 is assuredly overlapped (even with some manufacturing misalignment) and blocked by the opaque material of the first gate line GL1 in a top plan view sense, and thus a corresponding first light L1 generated from the backlight unit and trying to travel between the second pixel electrode PE2 and the fifth pixel electrode PE5 is blocked from doing so by the first gate line GL1. If the first width W1 is smaller than the first distance PI1, the first light L1 may pass through between the second pixel electrode PE2 and the fifth pixel electrode PE5, thereby causing deterioration in display quality of the display apparatus 500. However, according to the present exemplary embodiment, the first light L1 heading between the second and fifth pixel electrodes PE2 and PE5 is assuredly blocked by the first gate line GL1 since the first width W1 is greater than the first inter-pixel-electrode distance PI1.

FIG. 5 is a cross-sectional view taken along a line IV-IV' of FIG. 2.

Referring to FIGS. 2 and 5, the first storage electrode SE1 is directly disposed on the base substrate portion 10 and the gate insulating layer 20 is disposed over the first storage electrode SE1. In addition, the first data line DL1 is disposed on the gate insulating layer 20 to overlap with the first storage electrode SE1 in a plan view and thus define a storage capacitance.

The first storage electrode SE1 is partially overlapped with an edge of the first pixel electrode PE1 and with an edge of the third pixel electrode PE3 in the plan view sense. A capacitive coupling between the first storage electrode SE1 and the overlying pixel-electrodes may form an additional storage capacitor C1. The storage capacitor C1 may compensate for leakages of electric charge from liquid crystal capacitors defined by the first pixel electrode PE1, the liquid crystal 200, and the common electrode 320 and by the third pixel electrode PE3, the liquid crystal 200, and the common electrode 320.

The green color filter 40G is disposed directly on the passivating/insulating layer 30 and is overlapped by the planarization layer 50 where the latter is overlapped with the third pixel electrode PE3 in a top plan view sense. The green color filter 40G filters the light provided from the backlight unit (not shown) disposed under the display-controlling substrate 100 into a green light. In addition, although not shown in FIGS. 2 to 5, the green color filter 40G may be disposed on the passivating/insulating layer 30 to overlap with the sixth pixel electrode PE6 in the plan view.

Meanwhile, when viewed in a top plan view sense, the first storage electrode SE1 has a second width W2 which is wider than and overlaps an inter-electrode gap PI2 between the first pixel electrode PE1 and the third pixel electrode PE3 in the first direction D1. As a result, edges of the first pixel electrode PE1 and of the third pixel electrode PE3 are assuredly overlapped with the W2 width of the first storage electrode SE1 in a top plan view sense, and thus a second light L2 output from the backlight unit and attempting to travel between the first pixel electrode PE1 and the third pixel electrode PE3 is assuredly blocked by the first storage electrode SE1. If the second width W2 is smaller than the second distance PI2, the second light L2 may pass through between the first pixel electrode PE1 and the third pixel electrode PE3, thereby causing deterioration in a display quality (e.g., contrast) of the display apparatus 500. However, according to the present exemplary embodiment, the second light L2 heading between the first and third pixel electrodes PE1 and PE3 is blocked by the first storage electrode SE1 since the second width W2 is substantially greater than the second distance PI2.

Figure 6:
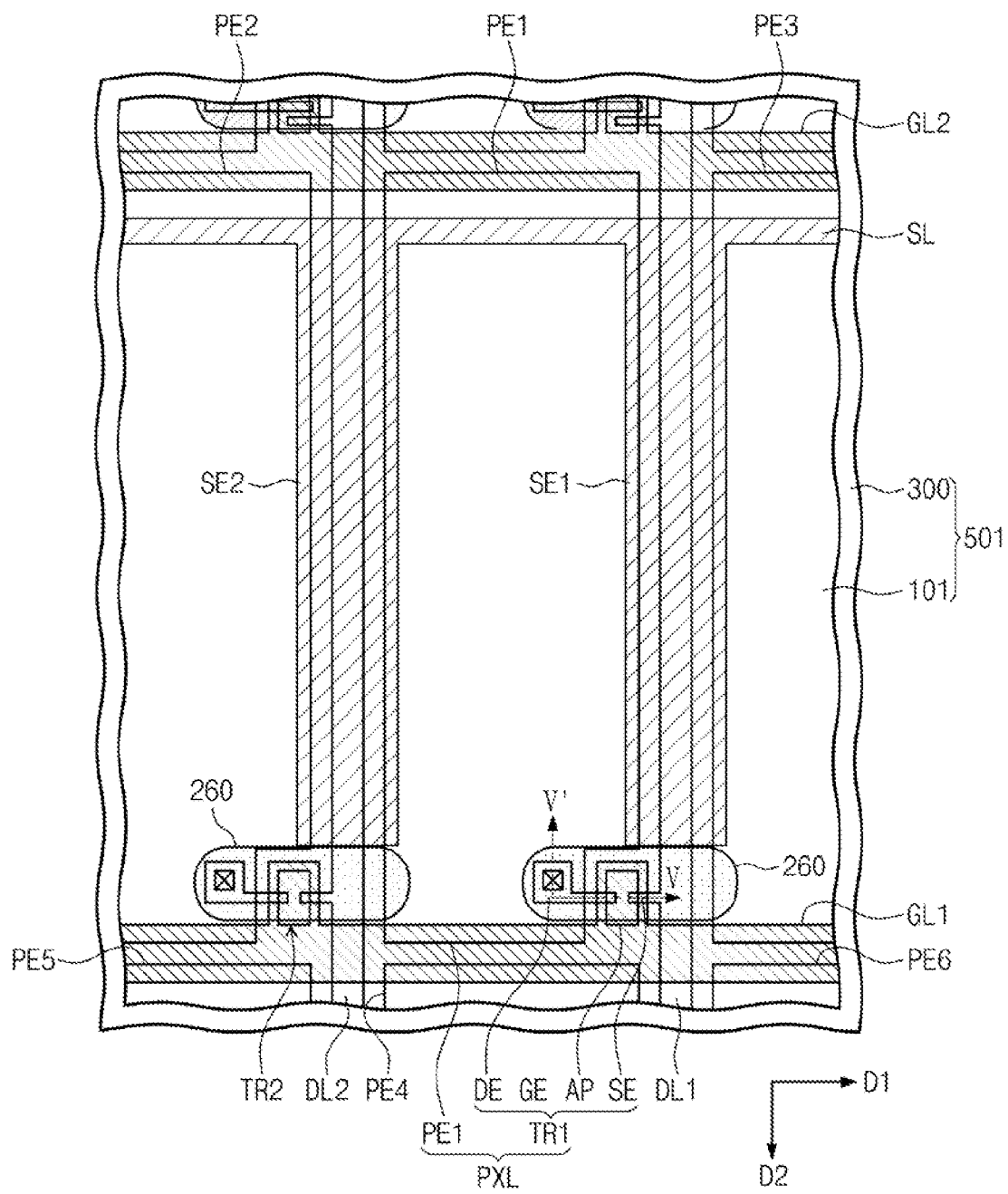
FIG. 6 is a plan view showing a display apparatus according to another exemplary embodiment in accordance with the disclosure.
Figure 7:
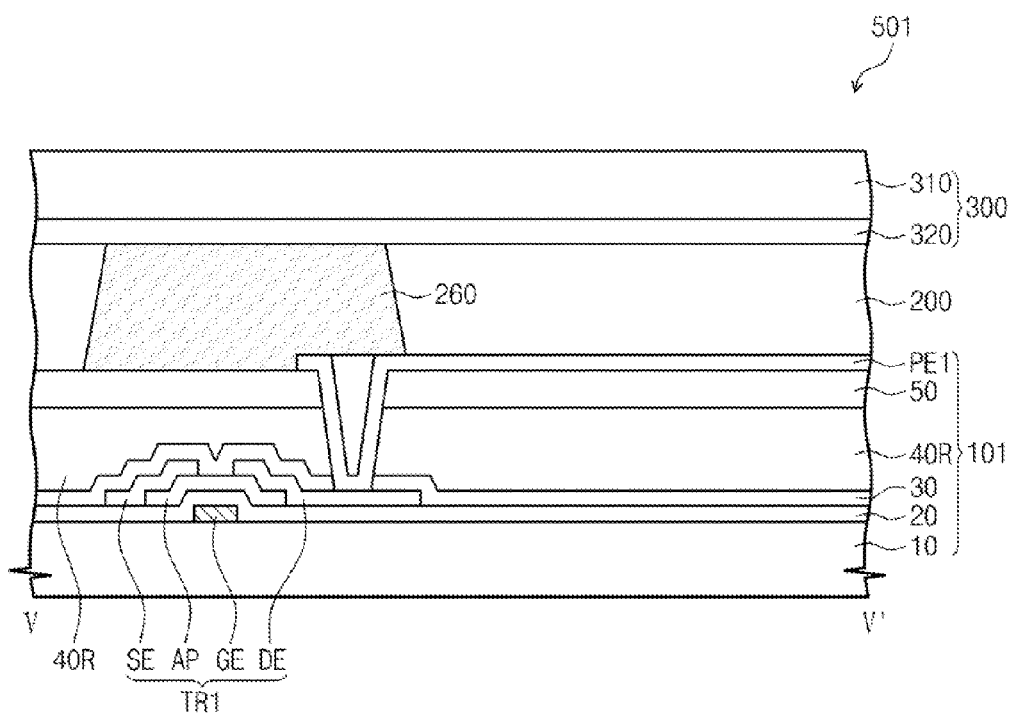
FIG. 7 is a cross-sectional view taken along a line V-V' of FIG. 6.

FIG. 6 is a plan view showing a display apparatus according to another exemplary embodiment. FIG. 7 is a cross-sectional view taken along a line V-V' of FIG. 6. In FIGS. 6 and 7, the same reference numerals denote the same elements in FIGS. 1A, 1B, and 2 to 5, and thus detailed descriptions of the same elements will be omitted.

Referring to FIGS. 6 and 7, a display apparatus 501 includes a display-controlling substrate 101 and an opposite substrate 300. The display-controlling substrate 101 includes first opaque spacers 260 instead of including the first and second light-blocking members 285 and 286 of FIG. 2. The first spacers 260 are disposed between the display-controlling panel 101 and the opposite substrate 300 to thereby define a gap space in which the liquid crystal material layer 200 is filled. The first spacers 260 have the same structure and function, and thus, for the convenience of explanation, two spacers will be described as an example.

According to the present exemplary embodiment as shown in FIGS. 6 and 7, the first spacers 260 include black organic material to block the light. However, the materials and/or structure of the spacers 260 is configured so as to not contaminate the adjacent liquid crystal material 200. In addition, the two first spacers 260 are positioned at positions corresponding to the first and second thin film transistors TR1 and TR2 in one-to-one correspondence to overlap with the first and second thin film transistors TR1 and TR2 in a plan view sense. Thus, the two first spacers 260 may cover the first and second thin film transistors TR1 and TR2 instead of the first and second light-blocking members 285 and 286 shown in FIGS. 2 and 3.

Referring to FIGS. 3 and 7, since the display-controlling panel 101 does not include the first light-blocking member 285, the red color filter 40R may be further filled in a space from which the first light-blocking member 285 is removed.

Figure 8:
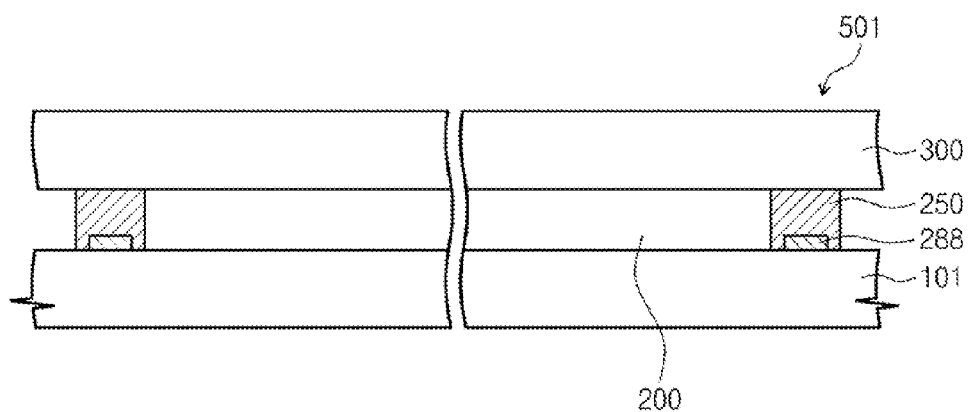
FIG. 8 is a sectional view showing the display apparatus of FIG. 7.

FIG. 8 is a sectional view showing the display apparatus of FIG. 7. In detail, FIG. 8 shows a cross-section of a display apparatus 501 including the display area and the peripheral area.

A second edge light-blocking member 288 shown in FIG. 8 has the same structure as and the different material from the first edge light-blocking member 280 shown in FIGS. 1A and 1B. Particularly, the first edge light-blocking member 280 includes the black organic material to block the light, but the second edge light-blocking member 288 includes a metal material, such as aluminum, chromium, etc., to block the light, which may be used to form the first and second gate lines GL1 and GL2, the first and second data lines DL1 and DL2, the storage line SL, and the first and second storage electrodes SE1 and SE2.

If the second edge light-blocking member 288 includes the opaque metal material, the manufacturing process for the display apparatus 501 may be additionally advantageous. In other words, referring to FIGS. 6 and 8, if the first and second thin film transistors TR1 and TR2 are covered by the two first spacers 260 instead of the first and second light-blocking members 285 and 286 and the first edge light-blocking member 280 including the organic material is replaced with the second edge light-blocking member 288 including the metal material, the process of forming the first and second light-blocking members 285 and 286 and the first edge light-blocking member 280 may be omitted to manufacture the display-controlling panel 101.

Meanwhile, since the second edge light-blocking member 288 includes the metal material, a process of forming the second edge light-blocking member 288 may be needed. However, the second edge light-blocking member 288 may formed through a process of forming metal lines on the base substrate portion 101, for example the first and second gate lines GL1 and GL2, the storage line SL, and the first and second data lines DL1 and DL2, or a process of repairing those metal lines. Accordingly, the manufacturing process for the display apparatus 501 does not need a separate process to form only the second edge light-blocking member 288.

Figure 9:
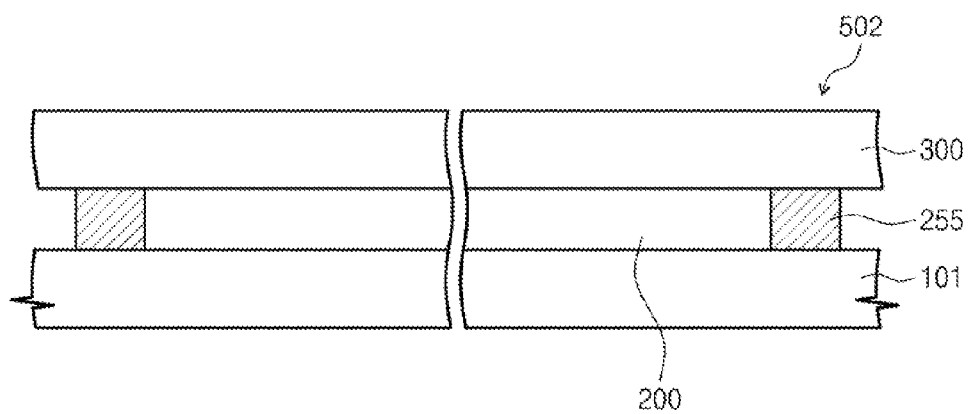
FIG. 9 is a sectional view showing a display apparatus according to another exemplary embodiment in accordance with the disclosure.

FIG. 9 is a sectional view showing a display apparatus according to another exemplary embodiment of the present invention.

When compared a display apparatus 502 shown in FIG. 9 with the display apparatus 501 shown in FIG. 8, the display apparatus 502 have the same structure and function as the display apparatus 501 except for the configuration related to a coupling member 255 and the second edge light-blocking member 288.

In detail, the display apparatus 502 includes the display-controlling panel 101, the opposite substrate 300, and the coupling member 300. The coupling member 255 is disposed between the display-controlling panel 101 and the opposite substrate 300 to couple the display-controlling panel 101 to the opposite substrate 300. In this case, the coupling member 255 includes a sealant to couple the display-controlling panel 101 to the opposite substrate 300 and a black pigment is intermixed with the sealant material, and thus the coupling member 255 may have superior light-blocking property compared with the coupling member 250 shown in FIG. 8. As described above, since the coupling member 255 may perform the function of blocking the light instead of the second edge light-blocking member 288, the second edge light-blocking member 288 may be removed from the display apparatus 502 shown in FIG. 9.

Figure 10:
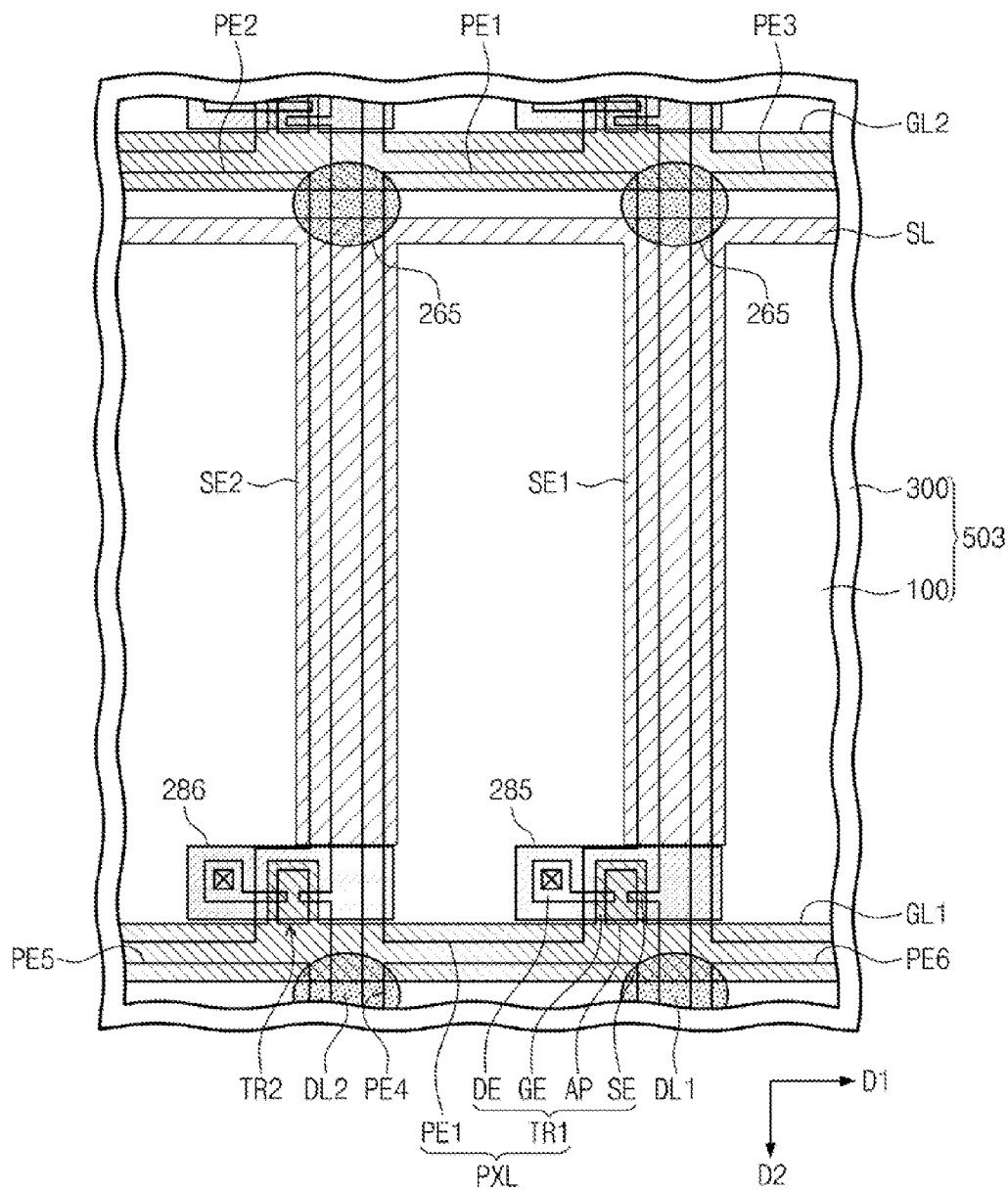
FIG. 10 is a sectional view showing a display apparatus according to another exemplary embodiment in accordance with the disclosure.

FIG. 10 is a sectional view showing a display apparatus according to another exemplary embodiment in accordance with the present disclosure. As shown in FIG. 10, a display apparatus 503 may further include second spacers 265 compared to the display apparatus 500 shown in FIG. 2.

The second spacers 265 are disposed between the display substrate 100 and the opposite substrate 300 as are the first spacers 260 and include the black organic material to block the light. In addition, the second spacers 265 may cover areas between two adjacent pixel electrodes, which are not covered by the first and second gate lines GL1 and GL2, the first and second storage electrodes SE1 and SE2, and the first and second data lines DL1 and DL2. Specifically, since the first and second storage electrodes SE1 and SE2 branched from the storage line SL may be formed through a process applied to form the first and second gate lines GL1 and GL2, the light may leak through the areas disposed between the storage line SL and the gate line (e.g., GL2) above it. In this potential leakage area between the first and second storage electrodes SE1 and SE2, there is no light control provided by any one of the first to sixth pixel electrodes, PE1 to PE6. However, the second spacers 265 may cover these areas even if the areas are not covered by the first to sixth pixel electrodes PE1 to PE6, thereby preventing the uncontrolled light from being leaked through these areas.

Although the exemplary embodiments in accordance with the present disclosure have been described, it is understood that the present teachings are not limited to these exemplary embodiments but various changes and modifications can be made by one ordinary skilled in the art in view of the foregoing where the changes are within the spirit and scope of the present teachings.

What is claimed is:

1. A display apparatus comprising:
   a first substrate having a display area and a peripheral area surrounding the display area, the display area including pixel units disposed therein for defining an image that is to be optimally viewed from a top plan view sense relative to the display area; and
   a second substrate facing the first substrate,
   wherein each of the pixel units comprises:
      a gate line segment having a first width in the plan view sense, a longitudinal length of the gate line segment extending in a first direction;
      a data line segment extending in a second direction different from the first direction;
      a color filter;
      a pixel electrode disposed on the color filter; and
      a storage electrode disposed on the first substrate, the storage electrode extending in the second direction and having a second width in the plan view sense,
         wherein a first gap dimension measured in the first direction and between two adjacent pixel electrodes is smaller than the first width of the gate line segment is overlapped by the gate line segment in the plan view sense, and
         wherein a second gap dimension measured in the second direction and between two adjacent pixel electrodes is smaller than the second width and is overlapped by the storage electrode segment in the plan view sense.

2. The display apparatus of claim 1, wherein each of the pixel units comprises:
   a thin film transistor electrically connected to the corresponding gate line segment and to the corresponding data line segment; and
   a light-blocking member that covers the thin film transistor to block a light from passing in the plan view sense through the area covered by the light-blocking member.

3. The display apparatus of claim 2, wherein replicas of the thin film transistor are provided in the display area, and replicas of the light-blocking member are provided in the display area, the thin film transistors corresponding to the plural light-blocking members are provided in one-to-one light-blocking correspondence, and each of the light-blocking members is positioned in an area in which the corresponding thin film transistor is formed, and the light-blocking members are spaced apart from each other and each has an island shape.

4. The display apparatus of claim 3, further comprising an edge light-blocking member arranged in the peripheral area to block light, and the light-blocking member and the edge light-blocking member comprise an organic material.

5. The display apparatus of claim 3, further comprising an edge light-blocking member arranged in the peripheral area to block the light, the light-blocking member comprises an organic material, and the edge light-blocking member comprises a metal material.

6. The display apparatus of claim 1, further comprising:
a first spacer disposed between the first substrate, and the opposite substrate to space the first substrate from the opposite substrate and block a light; and
an edge light-blocking member disposed in the peripheral area to block the light, wherein each of the pixel units is electrically connected to the corresponding gate line segment and to the corresponding data line segment and further comprises a thin film transistor overlapped with the first spacer in a plan view sense.

7. The display apparatus of claim 6, wherein the edge light-blocking member comprises a metal material.

8. The display apparatus of claim 6, further comprising a second spacer disposed between the first substrate and the opposite substrate and overlapped with an area between the gate line and the storage electrode to block the light.

9. The display apparatus of claim 1, further comprising:
a first spacer disposed between the first substrate and the opposite substrate to space the first substrate from the opposite substrate and block a light; and
a coupling member disposed between the first substrate and the opposite substrate corresponding to the peripheral area to couple the first substrate with the opposite substrate and block a light, wherein each of the pixels is electrically connected to the gate line segment and the data line segment and further comprises a thin film transistor overlapped with the first spacer in a plan view sense.

10. The display apparatus of claim 9, further comprising a second spacer disposed between the first substrate and the opposite substrate and overlapped with an area between the gate line segment and the storage electrode segment to block the light.

11. The display apparatus of claim 1, further comprising a storage line that is disposed on the first substrate, and is electrically connected to the storage electrode segment.

12. The display apparatus of claim 11, wherein the gate line segment and the storage line segment extend in a first direction and the storage electrode segment and the data line segment extend in a second direction substantially perpendicular to the first direction.

13. The display apparatus of claim 12, wherein replicas of the pixel electrode are provided in a plural number in the display area, and the pixel electrodes are distributed along the first and second directions.

14. The display apparatus of claim 13, wherein different colored versions of the color filter are provided in a plural number in the display area, the color filters correspond to the pixel electrodes in one-to-one correspondence, and the color filters include:
a first color filter having a first predominant coloration:
a second color filter having a second predominant coloration different from that of the first color filter; and
a third color filter having a third predominant coloration different from those of each of the first and second color filters.

15. The display apparatus of claim 14, further comprising a planarization layer disposed on the first, second, and third color filters to thereby provide a planarize surface above the first, second, and the third color filters.

16. The display apparatus of claim 1, further comprising a liquid crystal material disposed between the first substrate and the opposite substrate, wherein the opposite substrate comprises:
a second base substrate; and
a common electrode disposed on the second base substrate to face the pixel electrodes of the first substrate.

* * * * *